(No Model.) 6 Sheets—Sheet 1.

G. LIGOWSKY.
IRRIGATING APPARATUS.

No. 368,841. Patented Aug. 23, 1887.

Fig. 1.

Witnesses:
W. C. Jirdinston.
Frank O. Loveland.

Inventor:
George Ligowsky
by his Attorneys,
Partinson & Partinson (No Model.) 6 Sheets—Sheet 3.

G. LIGOWSKY.
IRRIGATING APPARATUS.

No. 368,841. Patented Aug. 23, 1887.

(No Model.) 6 Sheets—Sheet 5.

G. LIGOWSKY.
IRRIGATING APPARATUS.

No. 368,841. Patented Aug. 23, 1887.

Witnesses:
W. C. Jirdinston
Frank O. Loveland

Inventor:
George Ligowsky
by his Attorneys,
Partinson & Partinson

(No Model.) 6 Sheets—Sheet 6.

G. LIGOWSKY.
IRRIGATING APPARATUS.

No. 368,841. Patented Aug. 23, 1887.

Witnesses:
W. C. Jirdinston.
Frank O. Loveland.

Inventor:
George Ligowsky by his Attorneys,

UNITED STATES PATENT OFFICE.

GEORGE LIGOWSKY, OF CINCINNATI, OHIO.

IRRIGATING APPARATUS.

SPECIFICATION forming part of Letters Patent No. 368,841, dated August 23, 1887.

Application filed December 22, 1886. Serial No. 222,322. (No model.)

*To all whom it may concern:*

Be it known that I, GEORGE LIGOWSKY, a citizen of the United States, residing at Cincinnati, in the county of Hamilton and State of Ohio, have invented certain new and useful Improvements in Irrigating Apparatus, of which the following is a specification.

The methods of irrigating land upon a large scale heretofore in use have consisted, substantially, in running or pumping the water to a point above the land to be treated and then allowing the water to distribute itself through trenches, pipes, or their equivalents. These methods necessarily involve a very unequal distribution of the water, the ground immediately adjacent to the trenches or dischargevents of the pipes being more than saturated or flooded, while that more remote receives a percentage which decreases as the distance increases. This involves the use of a quantity of water vastly greater than would be required if it could be evenly distributed, and a drainage system is often required to carry off the surplus water. These methods are feasible only where the water-supply is practically inexhaustible and the land to be treated lies below the immediate water-supply. It is well known that the most effective method of irrigation is by water distributed in the form of a shower or spray. Heretofore this has been accomplished upon a small scale only by means of hand-sprinklers, roses upon hose-pipes, and occasionally by water-carts.

The object of my invention is to provide irrigating apparatus capable of use upon uneven surfaces, whether above or below the water-supply, which will distribute the water evenly and in the form of a spray and by which the quantity of water to be applied to all or any given portion of the land may be controlled at will.

My apparatus is adapted to irrigate, from a central water-supply, the land within a given radial distance from that supply, the distance depending upon the length of the apparatus.

My invention consists in novel mechanism for conveying and distributing the water, in adjustable mechanism for controilng the amount of water to be applied to any portion of the surface, in automatic registering and shifting mechanism, and in various details of construction hereinafter more fully set forth.

In the drawings, Fig. 11, a detail of the valve-closing mechanism; Fig. 12, a section of the rail-coupling device, and Fig. 13 a detail of a clamp for attaching distributing-buckets to the cable.

Figure 1:
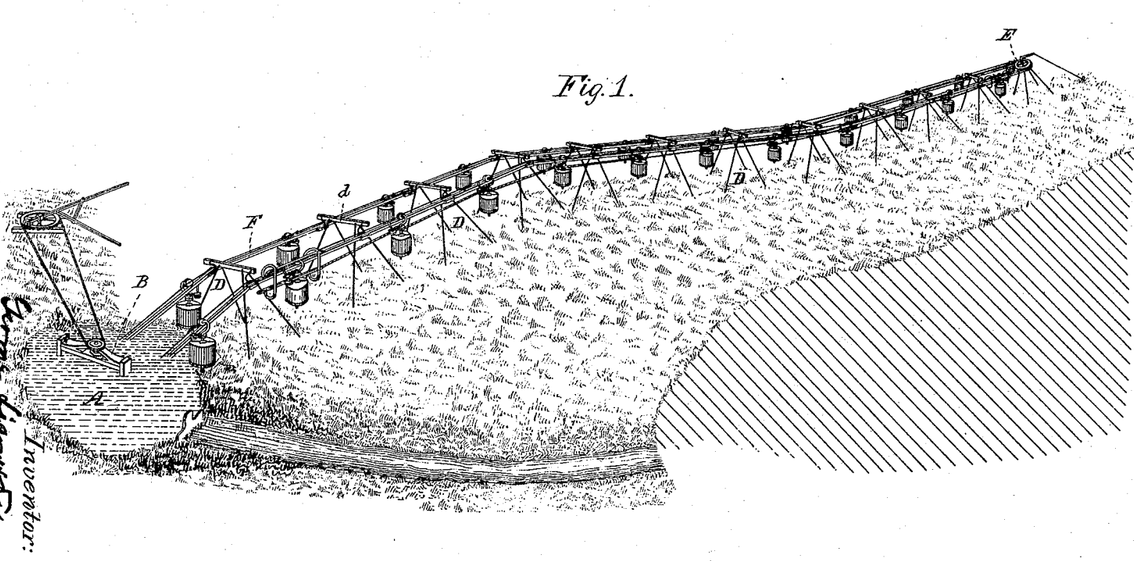
Figure 1 is a perspective view showing my irrigating apparatus upon an inclined surface.
Figure 2:
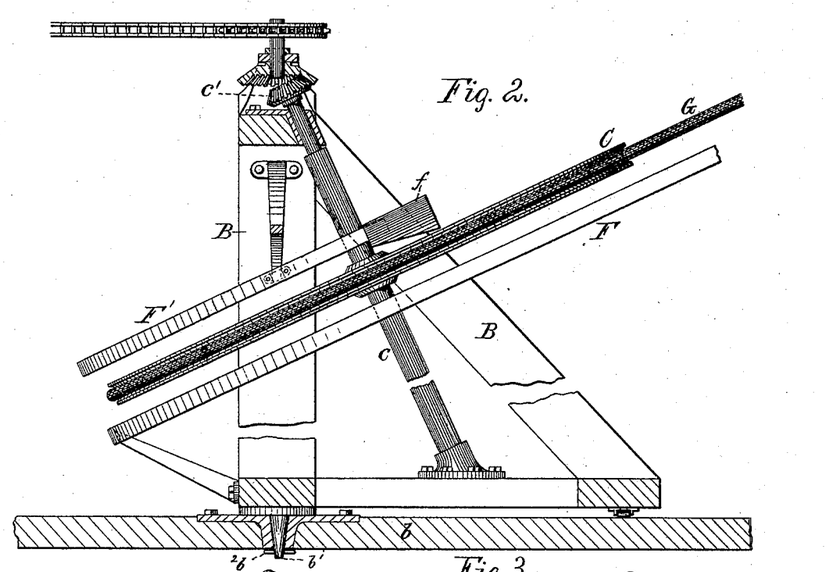
Fig. 2 is a side view, partly in section, showing the dipping-sheave, which is adapted to serve also as a driving-wheel.

A represents a pool or reservoir in which is placed a frame, B, pivotally mounted upon a bed or flooring, $b$, of plank or other suitable material. A dipping-wheel, C, is mounted upon a shaft, $c$, journaled in suitable bearings in the frame B. This dipping-sheave is preferably adapted to serve also as a driving-sheave, and for that purpose one end of the shaft $c$ is provided with a gear-wheel, $c'$, adapted to engage with and be actuated by any suitable driving mechanism. The frame may be secured to the bed in any suitable manner, the means here shown being a linchpin, $b'$, taking through the pivot.

D D are trestles for supporting the carrying and distributing devices.

Figures 4, 5:
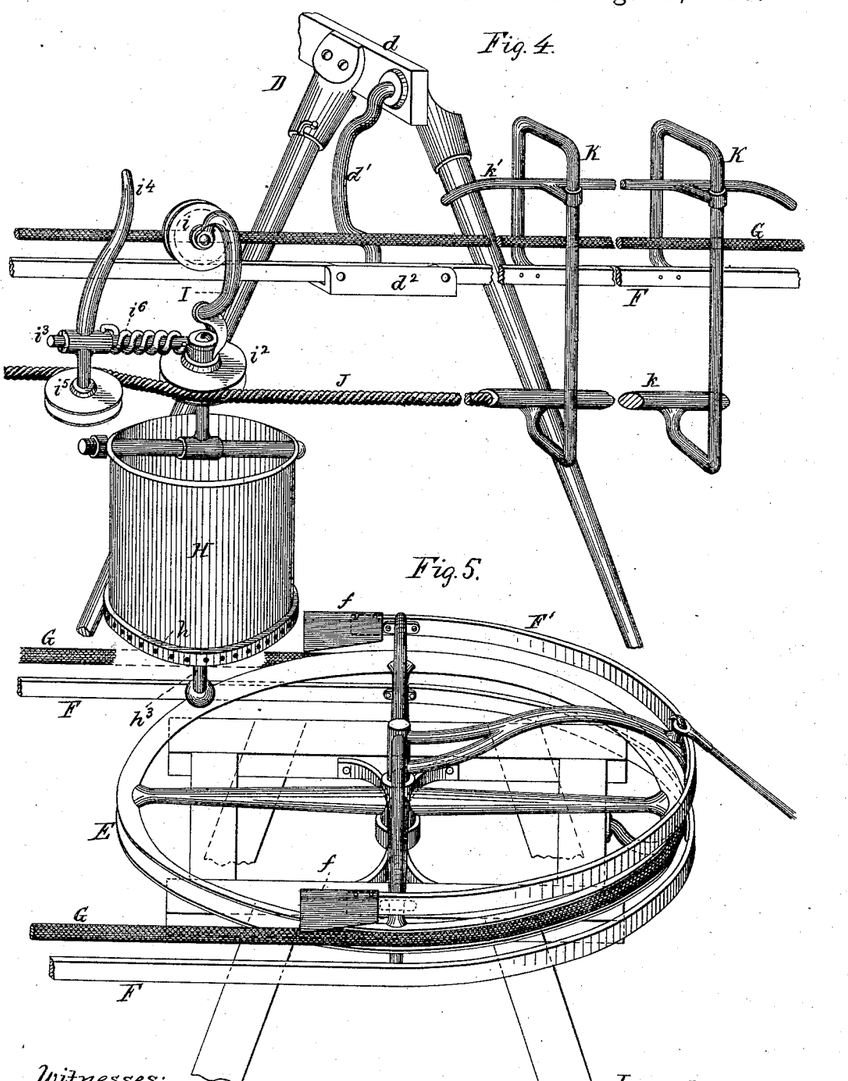
Fig. 4 is a side view of the same, showing the bucket about to leave the rotating device.
Fig. 5 is an isometrical view of the terminal sheave or drum.

E is a loose pulley, sheave, or drum located at the opposite end of the apparatus from the driving-sheave and serving as a terminal or return drum.

Figures 11, 12, 13:
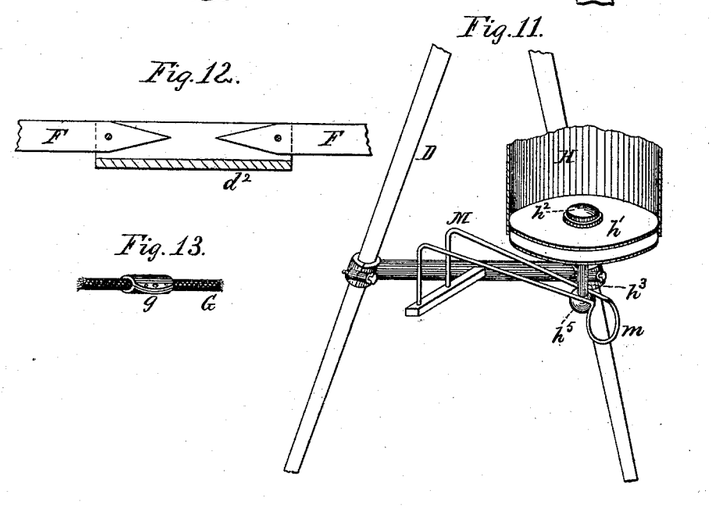

F F are rails, preferably composed of steel or other flexible material, suspended in swiveling hangers $d'$. These rails are united by suitable coupling-clasps $d^2$, to form a continuous or endless track.

G is an endless cable passing around the driving or dipping sheave and the end pulley and adapted to be actuated by the driving-sheave.

H H are carrying-buckets, secured by hangers I to the carrying-wheels $i$, which are in turn attached to the endless cable by a hook, $i'$, and clamp $g$, or other suitable means. The hangers are preferably of U shape in order to bring the center of gravity of the loaded bucket under the carrying-wheel. The buckets are preferably adapted to serve in the double capacity of conveying and distributing buckets and are provided with perforations $h$ for the discharge of the water.

In operation the driving and dipping sheave is partially submerged in a stream, pool, or reservoir of water and actuated by any suitable power, thereby actuating the endless cable. The buckets are drawn along by the cable, filling as they pass under the submerged portion of the driving and dipping sheave, and discharging their contents as they are drawn along the endless track.

Figure 10:
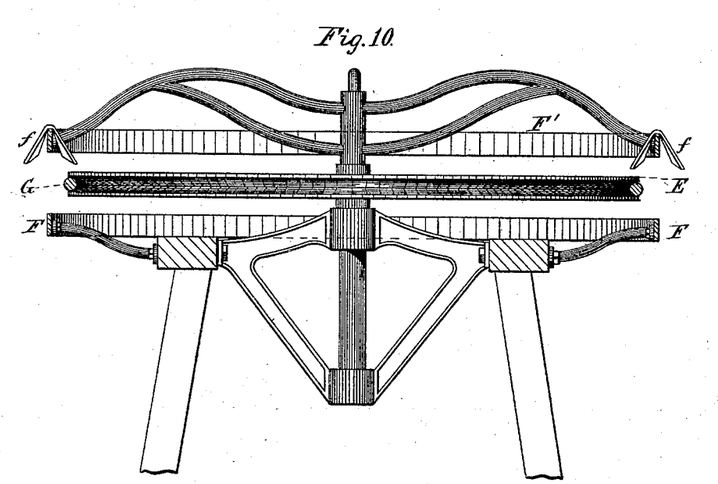
Fig. 10, a sectional view of the terminal drum or sheave.

In order to guard against any danger that the carrying-wheels will leave the track as they pass around the dipping-sheave and terminal drum, guard-rails F', adapted to engage at their lower edges with the grooves in the carrying-wheels, are placed above the curved portion of the endless track. These guard-rails are preferably provided with flaring hoods $f$, which serve as guides to insure the engagement of the guard-rails with the grooves in the carrying-wheel.

Figure 3:
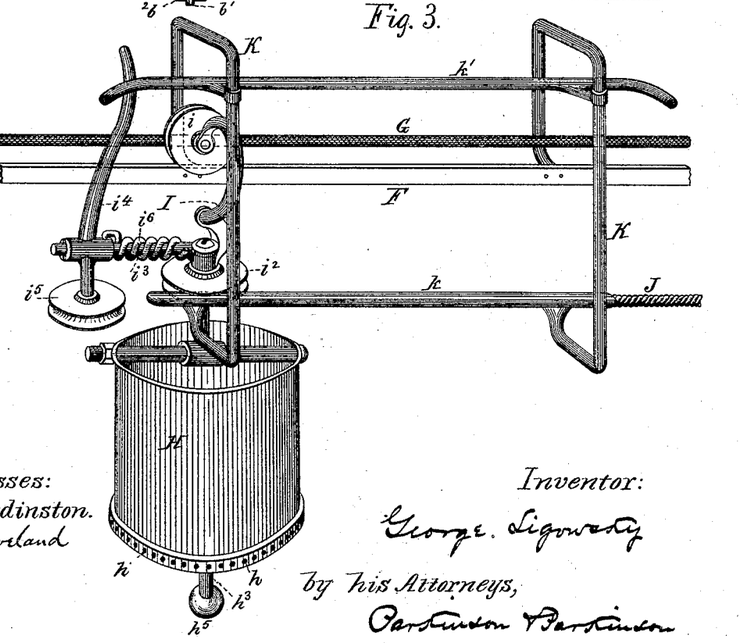
Fig. 3 is a side view of a distributing-bucket and a rotating device therefor, showing the bucket as it passes into engagement with the rotating device.

In order to irrigate a wider swath without moving or proportionally enlarging the apparatus, a rope, cord, or cable, J, is stretched between brackets K K. (Here shown as attached to the endless track.) The distributing-buckets are suspended from sheaves $i^2$, mounted upon spindles on the bucket-carrying hangers I. Bars $i^3$ project from the hangers I, and upon these bars are journaled lever-arms $i^4$, carrying loose pulleys or idlers $i^5$. A spring, $i^6$, is attached to the bar $i^3$ and the lever-arm $i^4$.

In operation the grooves in the sheaves $i^2$ take over the cord J, and the spring $i^6$ presses the idler $i^5$ against the cord upon the opposite side, thereby holding it in close contact with the sheaves and imparting a rapid rotary motion to the buckets as they travel along the endless track, thereby distributing the spray over a much wider strip than it would otherwise reach.

In order to lead the sheaves by which the rotary motion is imparted to the buckets into engagement with the cord which imparts the rotary motion, the end of the cord is incased in a hollow rod, $k$, supported by the brackets K, and hereinafter called the "stringing-rod." A curved rod, $k'$, hereinafter called the "cam-rod," is also supported by the brackets K. As the bucket approaches the incased end of the cord, the free end of the lever-arm $i^4$ engages with the curved end of the cam-rod, thereby throwing the idler $i^5$ outward and leaving sufficient space to enable the stringing-rod to readily and surely take between the idler and the sheave $i^2$. As soon as the lever-arm has passed the cam-rod, the spring $i^6$ presses the idler against the cord J and the bucket is rotated until the sheave passes out of engagement with the cord.

Figures 6, 7:
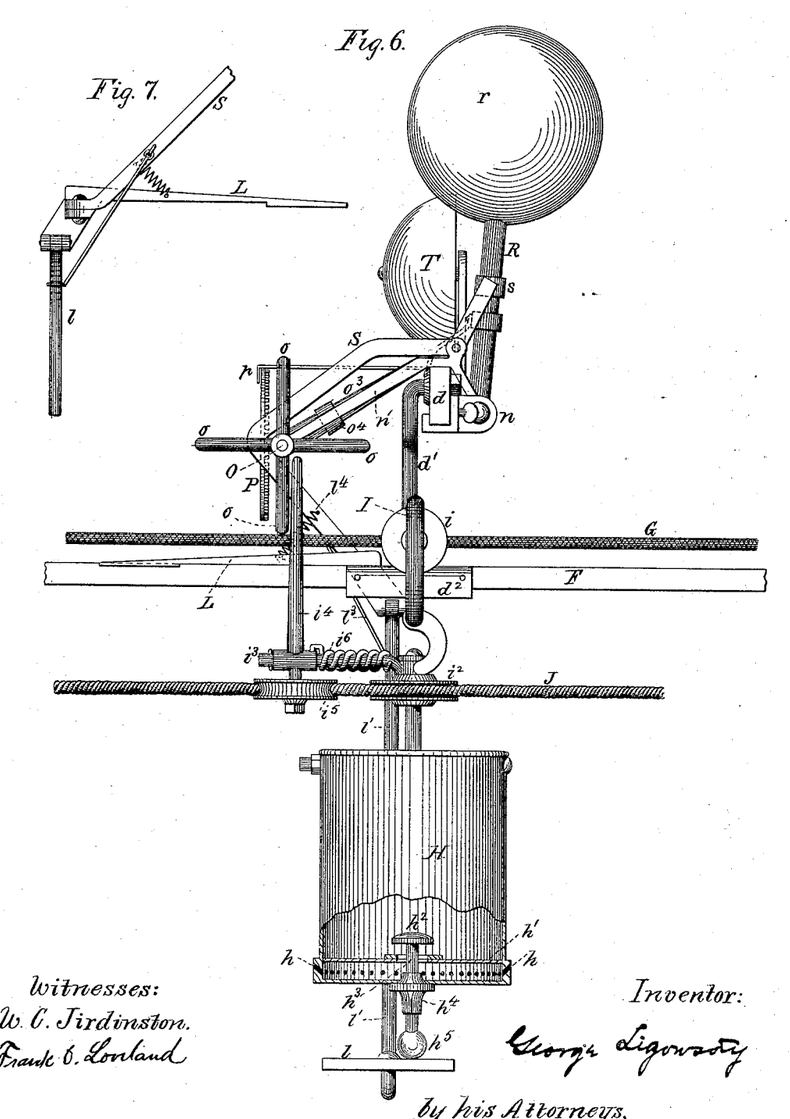
Fig. 6 shows the registering, switching, and valve-opening mechanism.
Fig. 7 is a detail of a portion of the switching mechanism.

When the apparatus is extended to a considerable distance from the water-supply, it is often desirable to discharge the water over a section only of the intervening ground and to vary this section at will. For this purpose the buckets are provided with adjustable mechanism adapted to prevent or permit the discharge of water. In the form shown the bucket is provided with a false bottom, $h'$, and a valve, $h^2$, having a stem, $h^3$, taking through a spring friction-collar, $h^4$, in the bottom of the bucket. The spring-collar $h^4$ is slotted a portion of its length and the slotted portion pressed inward to bear against the valve-stem. The bottom of the valve-stem is provided with an enlargement, $h^5$, preferably of globular form, and hereinafter called a "ball." At any point upon the endless track where it is desired that the discharge of water shall begin, and in line with the track, is placed a tripping-rail, L. This rail slopes upward from the end at which the buckets approach it and terminates abruptly at the opposite end. A tripping-plate, $l$, is suspended from the tripping-rail by a hanger, $l'$, in such a manner as to bring it in the same vertical plane with and slightly above the line of travel of the bottom of the valve-stem when the valve is closed. The loaded buckets travel along the endless rail with the valves closed until the tripping-rail is reached, when the carrying trucks travel up its inclined face and suddenly drop therefrom onto the endless rail. As the bucket drops, the lower end of the valve-stem engages with the tripping-plate and is held against downward motion, while the bucket descends a short distance farther, thereby forcing the valve open and allowing the water to escape. The spring-collar exerts sufficient pressure upon the valve-stem to prevent the valve from returning to its seat.

In order to close the valves before they reach the ducking-sheave on their return journey, a spring-yoke, M, having downwardly-inclined converging sides, united at the free end by a depending loop, $m$, is attached to one end of the supporting trestle. The loop $m$ is of sufficient size to permit the passage of the ball upon the end of the valve-stem. As the bucket reaches the yoke, the valve-stem enters the open end of the yoke and is guided by the converging sides into the narrow portion or neck, which engages with the ball and draws it downward until the valve is closed, the ball passing out through the loop.

The tripping rail and plate may be made detachable, so as to be readily placed upon or removed from any part of the endless track by hand; but I have illustrated them in connection with automatic shifting and registering mechanism, which will now be described.

Figure 8:
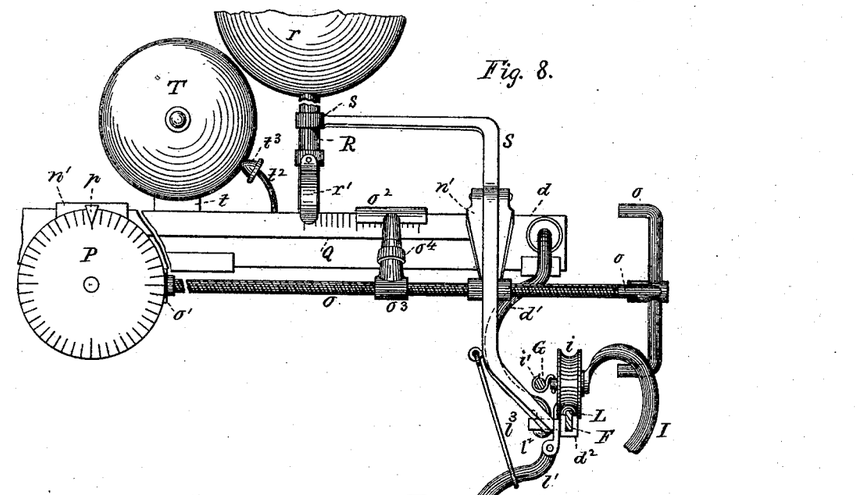
Fig. 8, a front view of the registering and switching mechanism.
Figure 9:
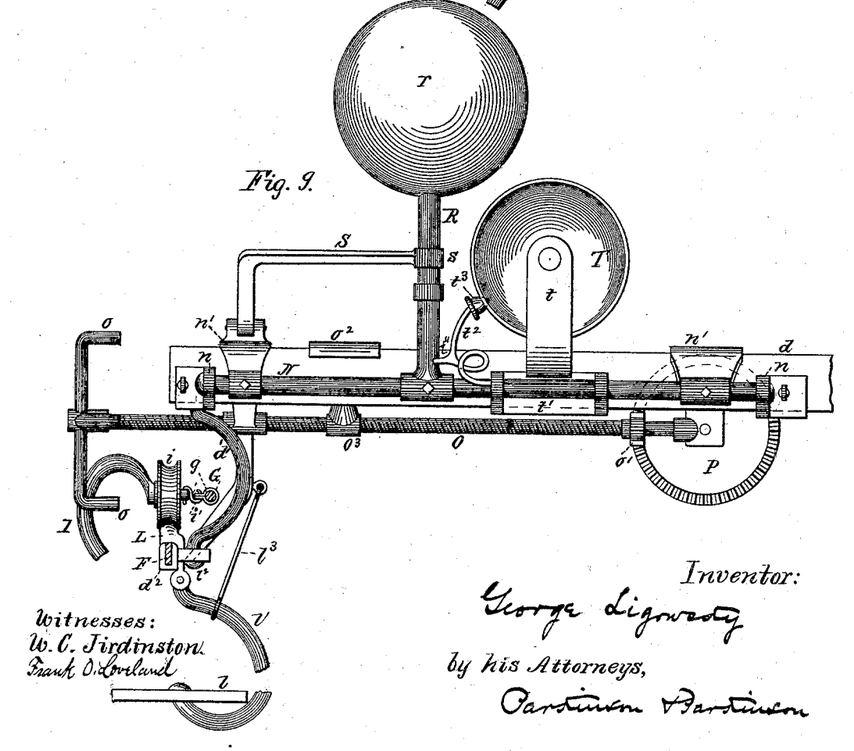
Fig. 9, a rear view of the same.

N represents a bar, mounted in bearings $n$, secured by set-screws or otherwise to the cross-beam of a trestle. Saddles $n'$, rigidly connected to the bar N, pass over the top of the trestle and support in suitable bearings a threaded rod, O, having at one end radial arms $o$, and near the other end a pinion, $o'$, adapted to engage with a toothed register-wheel, P, mounted upon a bearing in one of the saddles $n'$. The register-wheel is provided with an index and an index-finger, $p$. An index-plate, Q, graduated to correspond with the register-wheel, is loosely attached to the saddles $n'$. As a bucket-carrying wheel passes over the tripping-rail the U-shaped hanger of the bucket engages with one of the radial arms on the threaded rod, causing the latter to make a partial revolution, thereby communicating motion to the pinion and register-wheel.

In order to disengage the tripping mechanism when the desired amount of water has been distributed, a traveling trigger, $o^2$, is attached to the threaded rod by means of a split nut, $o^3$, which is locked by means of a ring, $o^4$. By slipping up the ring the nut may be disengaged and secured to the threaded rod opposite any point upon the scale-plate. A rod, R, slightly inclined from the vertical, and carrying a weight, $r$, is rigidly secured to the bar N. A finger, $r'$, adapted to take over the scale-plate, is pivotally attached to the rod R, and serves, when in engagement with the scale-plate, to hold the weighted rod from tipping. A crank-arm, S, is attached to the weighted rod R, (preferably by a collar, $s$,) hinged to one of the saddles $n'$, bent to avoid the traveling cable and pivotally secured to the tripping-rail in such a manner as to allow the latter to swing horizontally, but not vertically. The hanger supporting the coupling-clasp is hinged to a shoulder, $l^2$, projecting from the tripping-plate, and the link $l^3$ connects the crank-arm with the hanger. A spring, $l^4$, strained between the crank-arm and the tripping-rail, exerts a lateral pressure upon the latter.

The traveling trigger is set at that mark upon the scale-plate which indicates the quantity of water which it is desired to distribute.

The same motion of the threaded rod which actuates the register-wheel moves the traveling trigger in the direction of the finger $r'$. This motion is repeated with the passage of each bucket of water until the traveling trigger reaches the finger $r'$ and pushes it out of engagement with the scale-plate. The weighted rod is thereby released and falls backward, and in falling imparts an upward motion to the lever-arm, lifting the tripping-rail out of engagement with the endless track. The spring $l^4$ swings the free end of the tripping-rail out of line with the endless cable, thus allowing the tripping-rail to clear the cable and holding it suspended out of line of travel of the carrying-trucks. The same motion of the lever-arm, acting through the link $l^3$ upon the hanger supporting the tripping-plate, withdraws the latter from the line of travel of the buckets, which may then pass to another device of the same kind.

In order to notify the operator when the required number of buckets of water has been distributed upon the section then under treatment, a gong, T, is supported by a stem, $t$, upon the bracket $t'$, mounted upon the bar O, said bracket being secured against pivotal motion upon said bar by a set-screw or other convenient means for holding the same against the top rail, $d$, of the trestle. A looped spring, $t^2$, is secured to the bracket $t'$, and carries at its free end a hammer, $t^3$. This spring is provided with a lug, $t^4$, extending into the line of travel of the weighted rod R. When the weighted rod is released, it strikes the lug $t^4$ and causes the spring $t^2$ to vibrate, thereby causing motion of the hammer and ringing the gong.

The rails are preferably pivotally attached to the coupling-clasps, in order to allow the endless track to accommodate itself to the inequalities of the surface of the ground. The ends of the rails are beveled, as shown in Fig. 12, so that the carrying-wheel may meet with no obstruction as it passes from the coupling-clasp onto the rail, whatever the inclination of the rail may be. The upper edges of the coupling-clasps are beveled to conform with the contour of the groove in the carrying-wheels, thus constituting a bridge by which they may pass smoothly from one rail to the next.

The rails are preferably flexible, permitting the apparatus to extend in a curved line for the purpose of passing around an obstruction and dispensing with the necessity of a careful alignment of the supporting-trestles.

It is obvious that a bar or rail may be used in place of a cord for the purpose of imparting a rotary motion to the buckets.

When the apparatus has been set up and the ground within range of the spray from the distributing-buckets has been sufficiently moistened, the trestles are moved to one side and an adjoining strip or sector irrigated, the frame in which the dipping-sheave is mounted swinging upon its pivot to accommodate itself to the position of the remainder of the apparatus. In this manner a very considerable tract can be irrigated from a central water-supply without changing the location of the dipping or driving mechanism. The apparatus is designed for use with horse, steam, or other convenient power; but I prefer to drive it by means of a windmill whenever available.

I claim as my invention—

1. In combination with suitable actuating mechanism, a track, an endless cable, buckets supported by the track and propelled by the endless cable, and a dipping-sheave, substantially as and for the purpose specified.

2. In combination with suitable actuating mechanism, a track, an endless cable, a dipping-sheave, and buckets supported by the track, propelled by the endless cable, and adapted to discharge the water in the form of spray, substantially as and for the purpose specified.

3. In combination with suitable actuating mechanism, a track, an endless cable, a dipping-sheave, and combined conveying and distributing buckets, substantially as and for the purpose specified.

4. In combination with suitable actuating mechanism, a continuous track, an endless cable, buckets supported by the continuous track and propelled by the endless cable, and a dipping-sheave, substantially as and for the purpose specified.

5. In combination with suitable actuating mechanism, a track, an endless cable, buckets supported by the track and propelled by the endless cable, and a combined dipping and driving sheave, substantially as and for the purpose specified.

6. In combination with suitable actuating mechanism, a continuous track, an endless cable, buckets supported by the track and propelled by the endless cable, and a dipping-sheave supported in a pivotally-mounted frame, substantially as and for the purpose specified.

7. In combination with suitable actuating mechanism, a continuous track, an endless cable, buckets supported by the track and propelled by the endless cable, a dipping-sheave, and portable supporting-trestles, substantially as and for the purpose specified.

8. In combination with suitable actuating mechanism, an endless cable, a dipping-sheave, a track supported by swiveling hangers, and buckets supported by the track and propelled by the endless cable, substantially as and for the purpose specified.

9. In combination with suitable actuating mechanism, an endless cable, a dipping-sheave, a track composed of rails supported by swiveling hangers and united by coupling-clasps to which the rails are pivotally connected, and buckets supported by the track and propelled by the endless cable, substantially as and for the purpose specified.

10. In combination with suitable actuating mechanism, a track, an endless cable, traveling buckets, a dipping-sheave, a terminal drum, and guard-rails over the curved portion of the continuous track, substantially as and for the purpose specified.

11. In combination with suitable actuating mechanism, a track, an endless cable, traveling buckets, a dipping-sheave, and mechanism adapted to impart a rotary motion to the buckets, substantially as and for the purpose specified.

12. In combination with suitable actuating mechanism, a track, an endless cable, traveling buckets, a dipping-sheave, and mechanism for registering the quantity of water distributed, substantially as and for the purpose specified.

13. In combination with suitable actuating mechanism, a continuous track, an endless cable, a dipping-sheave, buckets provided with valves adapted, when closed, to prevent the discharge of the water, and mechanism for actuating the bucket-valves, substantially as and for the purpose specified.

14. In combination with suitable actuating mechanism, a track, an endless cable, a dipping-sheave, buckets provided with valves adapted, when closed, to prevent the discharge of the water, mechanism for actuating the bucket-valves, and means for shifting the valve-actuating mechanism from its position of engagement, substantially as and for the purpose specified.

15. In combination with suitable actuating mechanism, a track, an endless cable, a dipping-sheave, a cord stretched parallel with the track, a distributing-bucket having a sheave rigidly attached thereto, and a loose pulley adapted to hold the cord in contact with the groove in the sheave, substantially as and for the purpose specified.

16. The combination, in an irrigating apparatus, of a traveling bucket, a cable stretched parallel with the line of travel of the bucket, a sheave rigidly secured to the bucket and having a groove adapted to take over the cord, a loose pulley, and a spring adapted to press the loose pulley into engagement with the cord, substantially as and for the purpose specified.

17. In an irrigating apparatus, the combination of a traveling bucket, a cable stretched parallel with the line of travel of the bucket, a sheave rigidly secured to the bucket and having a V-shaped groove adapted to take over the cord, a lever-arm carrying a loose pulley, a spring adapted to press the loose pulley into engagement with the cord, a stringing-rod, and a cam-rod adapted to guide the sheave and pulley into engagement with the cord, substantially as and for the purpose specified.

18. In an irrigating apparatus, the combination of a track, an endless cable, a dipping-sheave, a truck adapted to travel upon the track and secured to the endless cable, with a bucket suspended from the track, substantially as and for the purpose specified.

19. A conveying and distributing bucket for irrigating apparatus, consisting of a tank having perforations for the discharge of the water, a false bottom having one or more apertures, and a valve adapted to close said apertures, substantially as and for the purpose specified.

20. A conveying and distributing bucket for irrigating apparatus, consisting of a tank having perforations for the discharge of the water, a false bottom having one or more apertures, a valve adapted to close said apertures, a valve-stem taking through the bottom of the tank, and a spring-collar adapted to engage with and support the valve-stem, substantially as and for the purpose specified.

21. A conveying and distributing bucket for irrigating apparatus, consisting of a tank having perforations for the discharge of the water, a false bottom having one or more apertures, a valve adapted to close said apertures, a valve-stem taking through the bottom of said tank, and a spring-collar adapted to support the valve-stem, in combination with a tripping-rail and tripping-plate, substantially as and for the purpose specified.

22. A conveying and distributing bucket for irrigating apparatus, consisting of a tank having perforations for the discharge of the water, a false bottom having one or more apertures, a valve adapted to close said apertures, a valve-stem taking through the bottom of the tank and having a ball upon its free end, and a spring-collar adapted to support the valve-stem, in combination with a yoke adapted to close the valve, substantially as and for the purpose specified.

23. A registering mechanism for irrigating apparatus, consisting of a threaded rod provided with radial arms adapted to be actuated by the passage of the distributing-buckets, a gear-wheel upon the threaded rod, and a toothed registering-wheel engaging with and adapted to be actuated by the gear-wheel, substantially as and for the purpose specified.

24. The combination, in an irrigating apparatus, of a bar pivotally secured to a supporting-trestle, a weighted rod rigidly secured thereto, a threaded rod mounted in saddles rigidly secured to the pivoted bar and having radial arms, a tripping-rail and a tripping-plate, an arm connecting the tripping-rail and tripping-plate with the weighted rod, a pivoted index-finger normally locking the weighted rod, and a trigger traveling upon said threaded rod and adapted to contact with said finger and push it out of engagement, releasing the weighted rod and allowing it to fall, thereby lifting the tripping and registering mechanism out of their operative positions, substantially as and for the purpose specified.

25. The combination, in an irrigating apparatus, of the pivoted bar N, the threaded rod O, having radial arms $o$, the tripping-rail L, the tripping-plate $l$, the weighted rod R, the crank-arm S, the pivoted finger $r'$, the traveling trigger $o^2$, and the gong T, having a spring-supported hammer, $t^3$, adapted to be actuated by said weighted rod, substantially as and for the purpose specified.

GEORGE LIGOWSKY.

Witnesses:
A. F. HERBSLEB,
JAMES N. RAMSEY.